(12) United States Patent
Wang et al.

(10) Patent No.: US 11,750,910 B2
(45) Date of Patent: *Sep. 5, 2023

(54) DISPLAY APPARATUS

(71) Applicant: DYNASCAN TECHNOLOGY CORP., Taoyuan (TW)

(72) Inventors: Tsun-I Wang, Taoyuan (TW); Ching-Chun Wu, Taoyuan (TW); Chia-Liang Yang, Taoyuan (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,864

(22) Filed: Feb. 24, 2022

(65) Prior Publication Data

US 2022/0182522 A1 Jun. 9, 2022

Related U.S. Application Data

(63) Continuation of application No. 16/234,456, filed on Dec. 27, 2018, now Pat. No. 11,290,628.

(51) Int. Cl.
| | |
|---|---|
| *H04N 23/57* | (2023.01) |
| *G09G 3/34* | (2006.01) |
| *H04N 5/262* | (2006.01) |
| *H04N 23/90* | (2023.01) |
| *G02F 1/1333* | (2006.01) |
| *G02F 1/13357* | (2006.01) |
| *G06T 7/00* | (2017.01) |

(52) U.S. Cl.
CPC .......... *H04N 23/57* (2023.01); *G09G 3/3406* (2013.01); *H04N 5/2624* (2013.01); *H04N 23/90* (2023.01); *G02F 1/133308* (2013.01); *G02F 1/133331* (2021.01); *G02F 1/133602* (2013.01); *G06T 7/0002* (2013.01)

(58) Field of Classification Search
CPC .. H05N 5/2257; H05N 5/2254; G06T 7/0002; G09G 5/10; H04N 2005/2255
See application file for complete search history.

(56) References Cited

U.S. PATENT DOCUMENTS 9,057,931 B1 * 6/2015 Baldwin ................ G03B 17/48
2009/0135115 A1 * 5/2009 Sakamoto ............ G02F 1/1336
345/84

(Continued)

FOREIGN PATENT DOCUMENTS

CN 1532540 A 9/2004
CN 101867787 B 1/2013
(Continued)

OTHER PUBLICATIONS

Search Report from Office Action in Taiwan Counterpart Application No. 108132075, dated Jul. 10, 2020, in 9 pages.
(Continued)

*Primary Examiner* — Jeremiah C Hallenbeck-Huber
(74) *Attorney, Agent, or Firm* — Duane Morris LLP (57) ABSTRACT

A display apparatus is provided. The display apparatus comprises a housing, a display unit, a backlight module and at least one image capturing device. The at least one image capturing device is located in the housing and is used for capturing an image of the display unit.

11 Claims, 9 Drawing Sheets

(56) References Cited

U.S. PATENT DOCUMENTS

| | | | | |
|---|---|---|---|---|
| 2009/0303346 | A1* | 12/2009 | Kanemitsu | G09G 3/3406 348/E5.022 |
| 2010/0315677 | A1* | 12/2010 | Yamamoto | H04N 1/6033 358/448 |
| 2011/0007033 | A1 | 1/2011 | Choi | |
| 2012/0146973 | A1* | 6/2012 | Kaji | G09G 3/3611 345/207 |
| 2012/0242621 | A1* | 9/2012 | Brown | H01L 27/14678 345/175 |
| 2013/0249865 | A1* | 9/2013 | Liu | G06F 3/0428 345/175 |
| 2013/0342558 | A1 | 12/2013 | Sasaki | |
| 2014/0132578 | A1* | 5/2014 | Zheng | G01J 1/4228 345/207 |
| 2015/0271392 | A1* | 9/2015 | Musgrave | G09G 3/3208 348/207.11 |
| 2015/0316702 | A1 | 11/2015 | Hyvarinen et al. | |
| 2015/0378197 | A1* | 12/2015 | Liu | H04M 1/0266 349/96 |
| 2016/0295116 | A1* | 10/2016 | Chieh | H04N 5/2256 |
| 2016/0358582 | A1* | 12/2016 | Lee | G06F 3/1446 |
| 2017/0108725 | A1* | 4/2017 | Morita | G03B 17/00 |
| 2017/0110047 | A1* | 4/2017 | Yen | G02F 1/13318 |
| 2017/0116932 | A1* | 4/2017 | Musgrave | G09G 3/3406 |
| 2017/0139250 | A1* | 5/2017 | Li | G02F 1/13318 |
| 2017/0279989 | A1* | 9/2017 | Yue | H04N 1/00411 |
| 2018/0342050 | A1* | 11/2018 | Fitzgerald | G06T 7/80 |
| 2019/0075272 | A1* | 3/2019 | Horio | H04N 5/247 |
| 2019/0089880 | A1* | 3/2019 | Murao | G02F 1/1339 |
| 2019/0158713 | A1* | 5/2019 | McMillan | H04N 5/247 |
| 2019/0243427 | A1* | 8/2019 | Nakamura | H04N 5/2254 |
| 2019/0248334 | A1* | 8/2019 | Greenberg | B60K 35/00 |
| 2019/0331960 | A1* | 10/2019 | Li | G02F 1/133615 |
| 2020/0286436 | A1* | 9/2020 | Lim | G01J 1/02 |

FOREIGN PATENT DOCUMENTS

| | | | |
|---|---|---|---|
| CN | 105051593 A | 11/2015 | |
| JP | H1151810 A | 2/1999 | |
| JP | 2011-063144 A | 3/2011 | |
| KR | 20150039277 A | 4/2015 | |
| WO | 2007026462 A1 | 3/2007 | |
| WO | WO-2007026462 A1 * | 3/2007 | G02F 1/13338 |

OTHER PUBLICATIONS

Extended European Search Report (EESR) dated Feb. 21, 2020 to related EP Patent Application No. 19000594.2, pp. 1-10.

* cited by examiner

DISPLAY APPARATUS

BACKGROUND

1. Field of the Disclosure

The present disclosure relates to a display apparatus. More particularly, the present disclosure relates to a display apparatus including an image capturing device.

2. Description of the Related Art

As display apparatuses are widely used in different environments, how to ensure the reliability and robustness of display apparatuses under harsh conditions has become an important issue. For example, a display apparatus may be placed outdoors for displaying advertisements. There is a need for the administrator or owner of the display apparatus or an advertiser to monitor whether the display apparatus is functioning properly.

In order to determine whether the images/videos displayed by a display apparatus are normal, correct or clear enough, a camera may be placed in front of a small portion of the viewing surface of the display apparatus, so as to monitor whether the images/videos displayed on the small portion of the viewing surface are normal. However, in such arrangement, the camera can only monitor a small portion of the viewing surface of the display apparatus and will block the small portion of the viewing surface. Alternatively, a camera may be mounted outside of and toward the display apparatus. By doing so, the camera may capture passers-by, thus creating personal privacy issues. How to avoid infringes privacy of passers-by and to ensure that the display apparatus is functioning properly is a problem that needs to solve.

SUMMARY

In view of the above, there is a need to provide a display apparatus with a more precise self-detection capability, so as to ensure the proper functioning of the display apparatus and to avoid the above problems.

In one aspect according to some embodiments, a display apparatus comprises a housing, a display unit, a backlight module and an image capturing device. The image capturing device is located in the housing and is used for capturing an image of the display unit.

In a preferred embodiment, the display apparatus further comprises a control device. The control device turns down the brightness of the backlight module when the image capturing device captures an image.

In a preferred embodiment, the backlight module comprises an optical film.

In another aspect according to some embodiments, a display apparatus comprises a housing, a display unit, a backlight module, an image capturing device and a reflector. The reflector and the image capturing device are located in such a way that the image capturing device captures an image via the reflector.

In yet another aspect according to some embodiments, a display apparatus comprises a housing, a transparent plate, a liquid crystal layer, a backlight module and an image capturing device. The image capturing device is located in the housing and is substantially between the transparent plate and the liquid crystal layer. The image capturing device is used for capturing an image of the liquid crystal layer.

In a preferred embodiment, the display apparatus further comprises a reflector.

In yet another aspect according to some embodiments, a display apparatus comprises a housing, a display unit, a backlight module and an image capturing device. The backlight module is a direct backlight module including a plurality of light sources, and the image capturing device is mounted on the backlight module among the plurality of light sources.

In a preferred embodiment, the display unit comprises an optical film.

Other aspects and embodiments of the present disclosure are also contemplated. The foregoing summary and the following detailed description are not meant to limit the present disclosure to any particular embodiment but are merely meant to describe some embodiments of the present disclosure.

BRIEF DESCRIPTION OF THE DRAWINGS

For a better understanding of the nature and objects of some embodiments of the present disclosure, reference should be made to the following detailed description taken in conjunction with the accompanying drawings. In the drawings, identical or functionally identical elements are given the same reference numbers unless otherwise specified.

DETAILED DESCRIPTION

Figure 1:
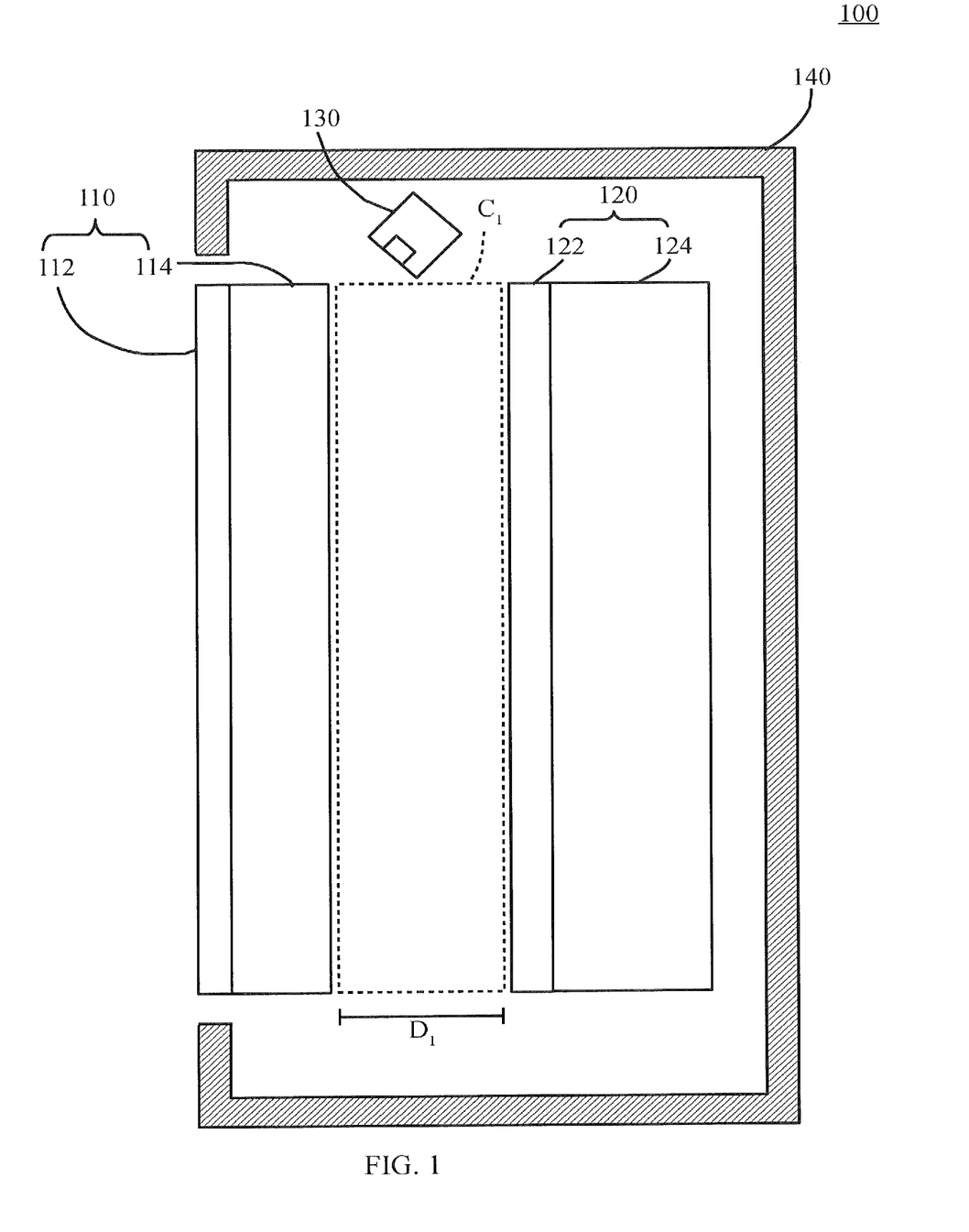
FIG. 1 is a cross-sectional view of a display apparatus 100 according to some embodiments of the present disclosure.

FIG. 1 is a cross-sectional view of a display apparatus 100 according to some embodiments of the present disclosure. As shown in FIG. 1, the display apparatus 100 includes a display unit 110, a backlight module 120, an image capturing device 130 and a housing 140. As shown in FIG. 1, an optical cavity $C_1$ is formed between the display unit 110 and the backlight module 120. The image capturing device 130 can be a camera. Specifically, the image capturing device 130 is located substantially between the display unit 110 and the backlight module 120 and faces toward the display unit 110 for capturing an image of the display unit 110. The images captured over time can be used to determine whether the display unit 110 is functioning properly.

According to the present disclosure, the image capturing device 130 is located substantially between the display unit 110 and the backlight module 120. In some embodiments, the image capturing device 130 can be placed between the display unit 110 and the backlight module 120 and slightly adjacent to the display unit 110 or slightly adjacent to the backlight module 120. In some embodiments, the image capturing device 130 is placed between the display unit 110 and the backlight module 120 and apart from a center of a display area of the display unit 110, In some preferred embodiments, the image capturing device 130 is placed between the display unit 110 and the backlight module 120 without overlapping the display area of the display unit 110. In another some preferred embodiments, the image capturing device 130 is placed around periphery of a space between the display unit 110 and the backlight module 120. According to the present disclosure, the image capturing device 130 may be fixed on an inner surface of the housing 140, or may be fixed on other components within the housing 140, so as to be placed substantially between the display unit and the backlight module.

In a preferred embodiment, the display unit 110 includes a liquid crystal layer 114 and optionally a transparent plate 112 for protecting the liquid crystal layer 114. The backlight module 120 includes a backlight unit 124 and optionally one or more optical films 122. In one embodiment, if the display apparatus 100 is a liquid crystal display with a direct LED backlight module, then the backlight unit 124 includes a plurality of light sources and a backlight assembly for mounting the plurality of light sources. In another embodiment, if the display apparatus 100 is a liquid crystal display with an edge-lit backlight module, then the backlight unit 124 includes a light source for side illumination and a light guiding plate. The one or more optical films 122 can be, for example, a light diffuser, a light reflector, a brightness enhancement film, or a combination of two or more thereof. The type and number of optical films to be used can be determined based on situational needs and thus not are limited here. Although the optical films 122 are included in the display unit 110 in the above embodiments, they may be included in the display unit 110 or be a separate component in the display in other embodiments.

As shown in FIG. 1, the optical cavity $C_1$ is formed between the display unit 110 and the backlight module 120 and, particularly, formed between the liquid crystal layer 114 and the optical films 122 of the backlight module 120. The distance $D_1$ between the liquid crystal layer 114 and the optical films 122 may be sufficient for the image capture device to determine that the display device is normal, correct or clear enough. It should be noted that the distance $D_1$ can be properly adjusted based on situational needs so that the image capturing device 130 can be placed substantially between the liquid crystal layer 114 and the optical films 122 and can capture an image of the display unit 110 through the optical cavity 130. In some embodiments, the captured image corresponds to substantially the entire display area of the display unit 110. In some other embodiments, the captured image corresponds to at least a portion of the display area of the display unit 110.

Figure 2:
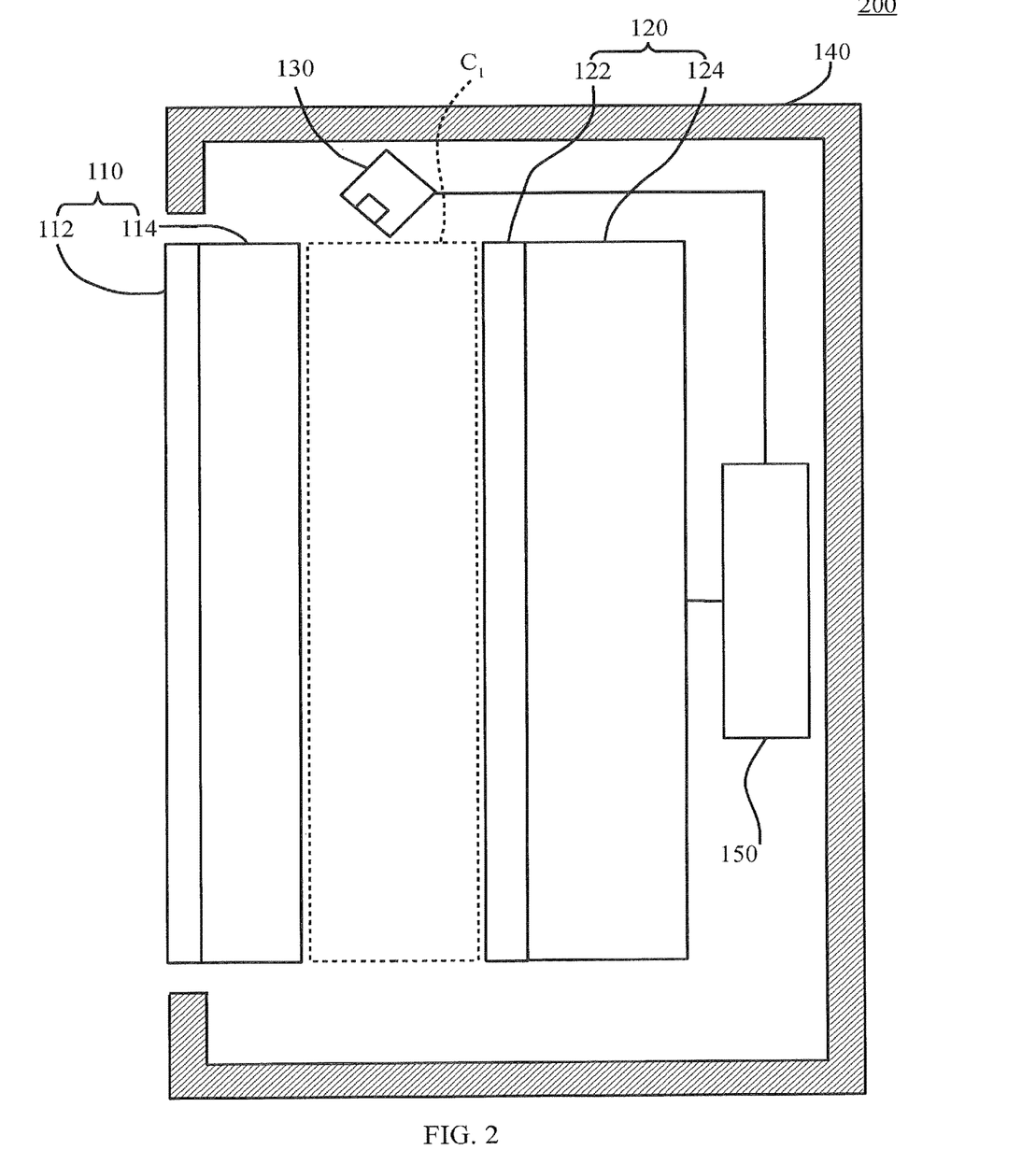
FIG. 2 is a cross-sectional view of a display apparatus 200 according to some embodiments of the present disclosure.

FIG. 2 is a cross-sectional view of a display apparatus 200 according to some embodiments of the present disclosure. The display apparatus 200 shown in FIG. 2 is similar to the display apparatus 100 shown in FIG. 1. The components of the display apparatus 200 in FIG. 2 with the same reference numerals as those of the display apparatus 100 in FIG. 1 refer to the same or similar components, and thus their detailed descriptions are not repeated here. The difference between the display apparatus 200 shown in FIG. 2 and the display apparatus 100 shown in FIG. 1 is that the display apparatus 200 further includes a control device 150. The control device 150 is electrically connected to the backlight module 120 and the image capturing device 130. The control device 150 can be any commercially available controller or microprocessor or the like.

In some circumstances, since the image capturing device 130 captures images from the inside of the display device 200 toward the display unit 110 through the optical cavity $C_1$, the brightness generated by the backlight module 120 may cause the image capturing device 130 to be overexposed and unable to capture images. To solve this problem, the control device 150 may turn down or turn off the brightness of the backlight module 120 when the image capturing device 130 captures an image so that ambient light entering the display unit 110 becomes the backlight source required for the image capture device 130.

Figure 3:
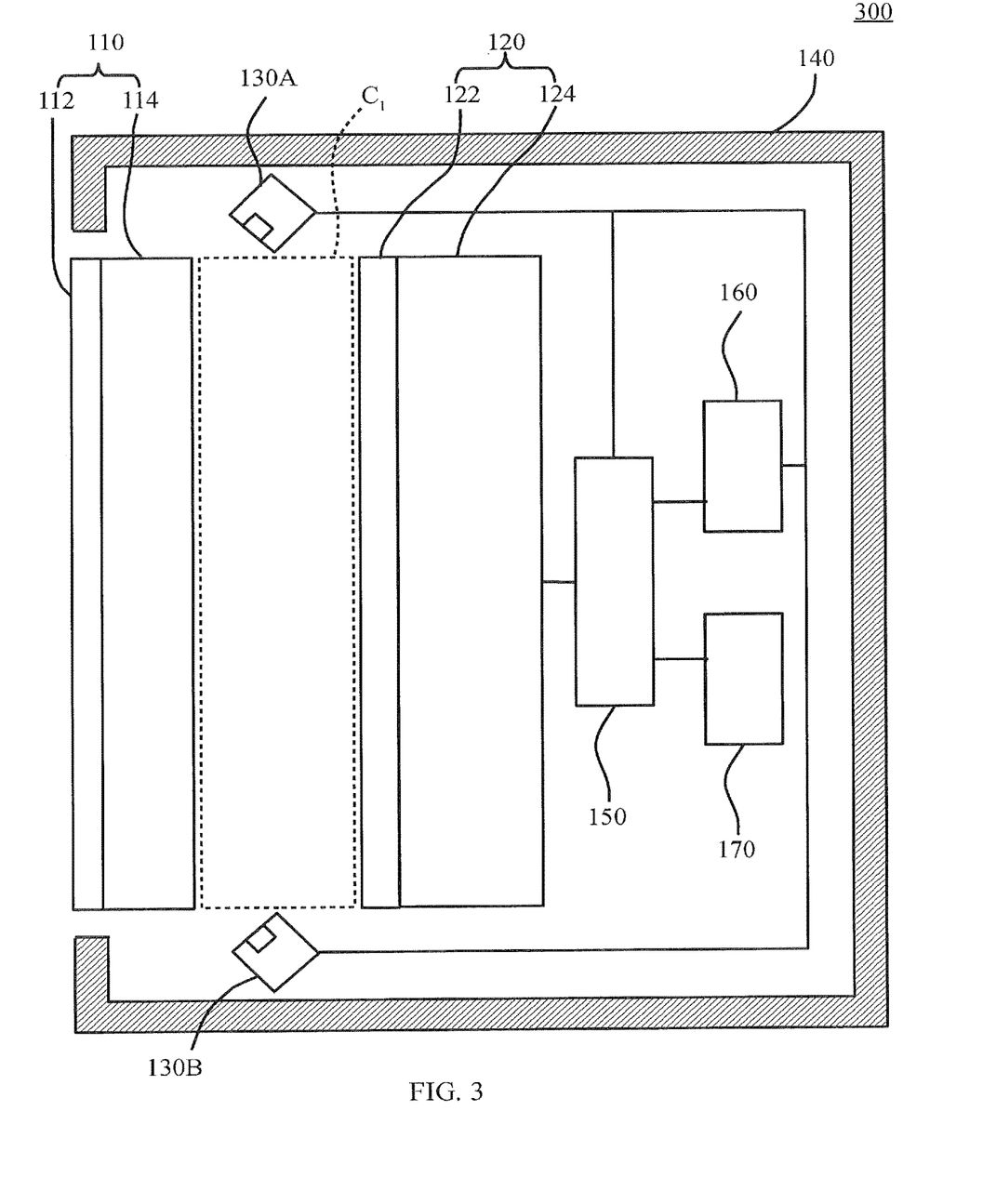
FIG. 3 is a cross-sectional view of a display apparatus 300 according to some embodiments of the present disclosure.

FIG. 3 is a cross-sectional view of a display apparatus 300 according to some embodiments of the present disclosure. The display apparatus 300 shown in FIG. 3 is similar to the display apparatuses 100 and 200 shown in FIGS. 1 and 2. The components of the display apparatus 300 in FIG. 3 with the same reference numerals as those of the display apparatuses 100 and 200 in FIGS. 1 and 2 refer to the same or similar components, and thus their detailed descriptions are not repeated here. The difference between the display apparatus 300 shown in FIG. 3 and the display apparatus 200 shown in FIG. 2 is that the display apparatus 300 includes two image capturing devices 130A and 130B and further includes an image processing unit 160 and a communication module 170. The image capturing devices 130A and 130B are electrically connected to the image processing unit 160 and the control device 150.

Figure 4:
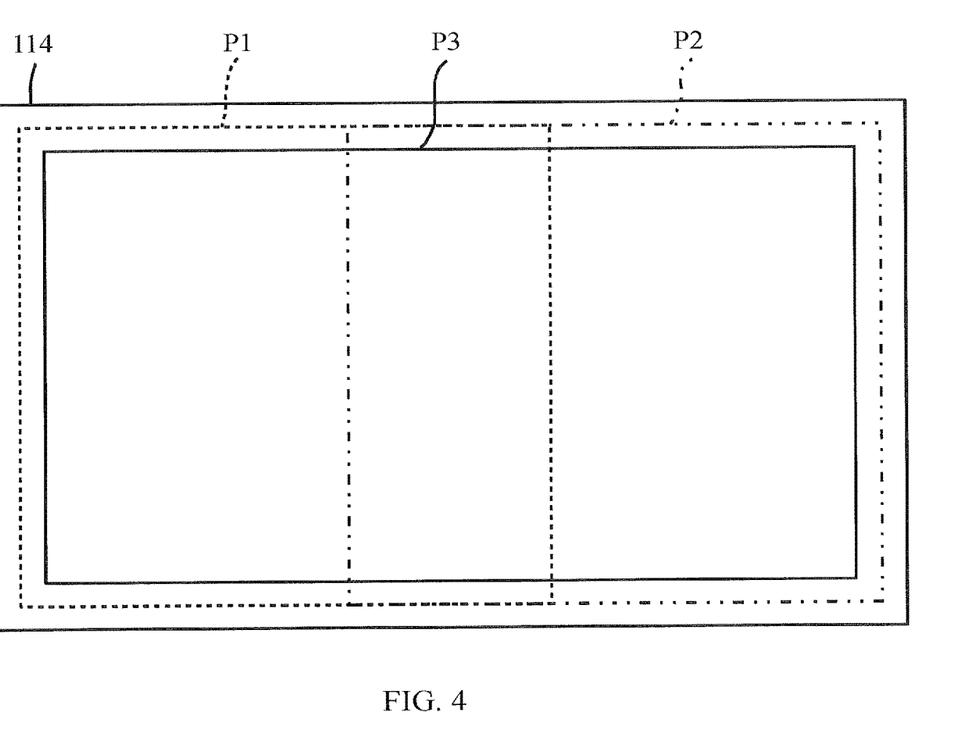
FIG. 4 is a schematic view showing different portions captured by different image capturing devices.

The image capturing devices 130A and 130B are disposed around the periphery of the optical cavity $C_1$ (without blocking the display area of the liquid crystal layer 114) for capturing images/videos from different portions of the liquid crystal layer 114. FIG. 4 is a schematic view showing different portions captured by different image capturing devices. As shown in FIG. 4, the image capturing device 130A captures a first image which corresponds to a first portion P1 of the display area of the liquid crystal layer 114, and the image capturing device 130B captures a second image which corresponds to a second portion P2 of the display area of the liquid crystal layer 114. Then, the captured first and second images can be transmitted to the image processing unit 160. The image processing unit 160, based on the first image and the second image, generates a third image which corresponds to a third portion P3 of the display area, wherein the third portion P3 overlaps the first portion P1 and the second portion P2 and is bigger than both the first portion P1 and the second portion P2. Afterwards, the third image is transmitted to the communication module 170.

The communication module 170 is electrically connected to the image processing unit 160 and the control device 150. The communication module 170 can transmit the third image to an external electronic device (not shown) via wired and/or wireless transmissions. The external electronic device can be, for example, a mobile phone, a tablet, a notebook, a desktop, or some other electronic device having a screen, and is used for receiving signal or images/videos from the display apparatus 300. The external electronic device shows a received signal or image/video on a screen so that a user of the external electronic device (e.g., the administrator or owner of the display apparatus 300 or an advertiser) can determine whether the image/video being played by the display apparatus 300 is normal, correct or clear enough. If the user determines that the signal or image/video displayed by the display apparatus 300 should be adjusted, then he/she can set one or more parameters using the software application on the external electronic device. The parameters can be, for example, brightness, contrast, display modes (e.g., standard, warm, cool, multimedia, movie and so on), color settings, sharpness and so on. Then, the external electronic device transmits the parameters and/or other control signals to the communication module 170 of the display apparatus 300 via wired and/or wireless transmissions. The communication module 170 receives the parameters and/or control signals and transmits them to the control device 150 such that the control device 150 can adjust the operations of the backlight module 120, the display unit 110 and/or other components of the display apparatus 300.

For the sake of simplicity, two image capturing devices 130A and 130B are described in the embodiment shown in FIG. 3. It should be noted that the number and type of image capturing devices to be used can be determined based on situational needs and thus are not limited here. For example, if an image capturing device (e.g., a camera) can only capture one quarter of the screen size, then the display apparatus needs at least four image capturing devices (e.g., four cameras) to capture four different portions (e.g., the four quadrants) of the liquid crystal layer 114 such that the image processing unit 160 can generate an image which corresponds to substantially the entire display area of the liquid crystal layer 114.

Although the control device 150, the image processing unit 160 and the communication module 170 are three separate components in the above embodiments, persons with ordinary skills in the field would understand that the three components may be implemented by a single device or two devices. Thus, the arrangements of and connections among the three devices are not limited to the above embodiments.

Figure 5A:
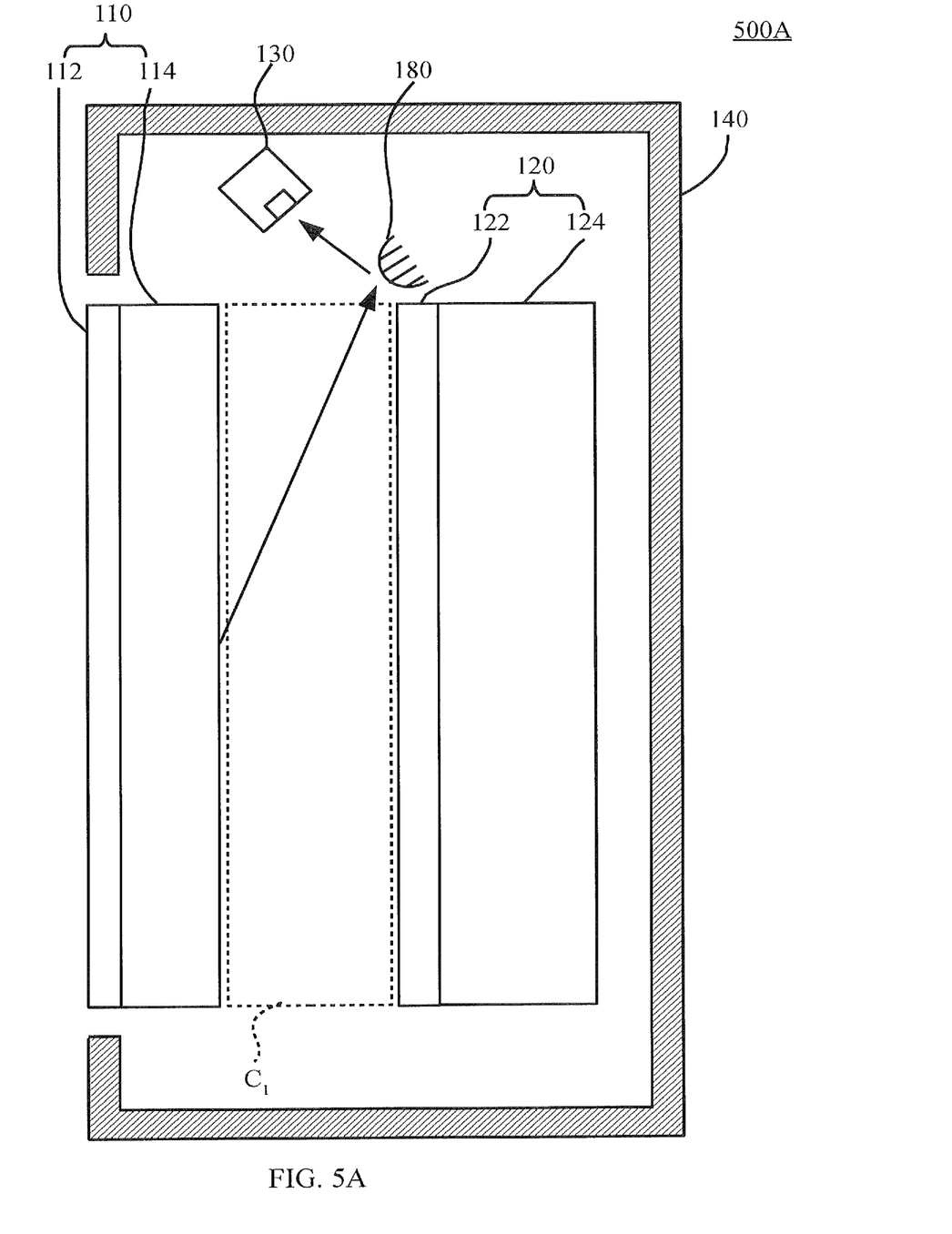
FIG. 5A is a cross-sectional view of a display apparatus 500A according to some embodiments of the present disclosure.

FIG. 5A is a cross-sectional view of a display apparatus 500A according to some embodiments of the present disclosure. As shown in FIG. 5A, the display apparatus 500A includes a display unit 110, a backlight module 120, an image capturing device 130, a housing 140 and a reflector 180. The components of the display apparatus 500A in FIG. 5A with the same reference numerals as those of the display apparatus 100 in FIG. 1 refer to the same or similar components, and thus their detailed descriptions are not repeated here. The difference between the display apparatus 500A shown in FIG. 5A and the display apparatus 100 shown in FIG. 1 is that the display apparatus 500A further includes the reflector 180. The reflector 180 can be, for example, a convex mirror.

In this embodiment, the reflector 180 is located in the housing 140 without overlapping the display area of the display unit 110. Specifically, the image capturing device 130 is located substantially between the liquid crystal layer 114 and the optical films 122 and faces toward the reflector 180. The reflector 180 and the image capturing device 130 are disposed in such a way that the image capturing device 130 can capture images/videos displayed by the display unit 110 via the reflector 180. As indicated by the arrow in FIG. 5A, the images/videos displayed by the display unit 110 can be projected on the reflector 180, and thus the image capturing device 130 can capture an image shown on the reflector 180. The images captured over time can be further processed and used to determine whether the display unit 110 is functioning properly.

Please be advised that, due to the optical characteristics of the convex mirror, an image captured by the image capturing device 130 via the convex mirror corresponds to a bigger portion of the display area than that of an image directly captured by the image capturing device 130. That is, the number of image capturing devices 130 used for capturing images of the entire display area can be reduced by utilizing the convex mirror.

Figure 5B:
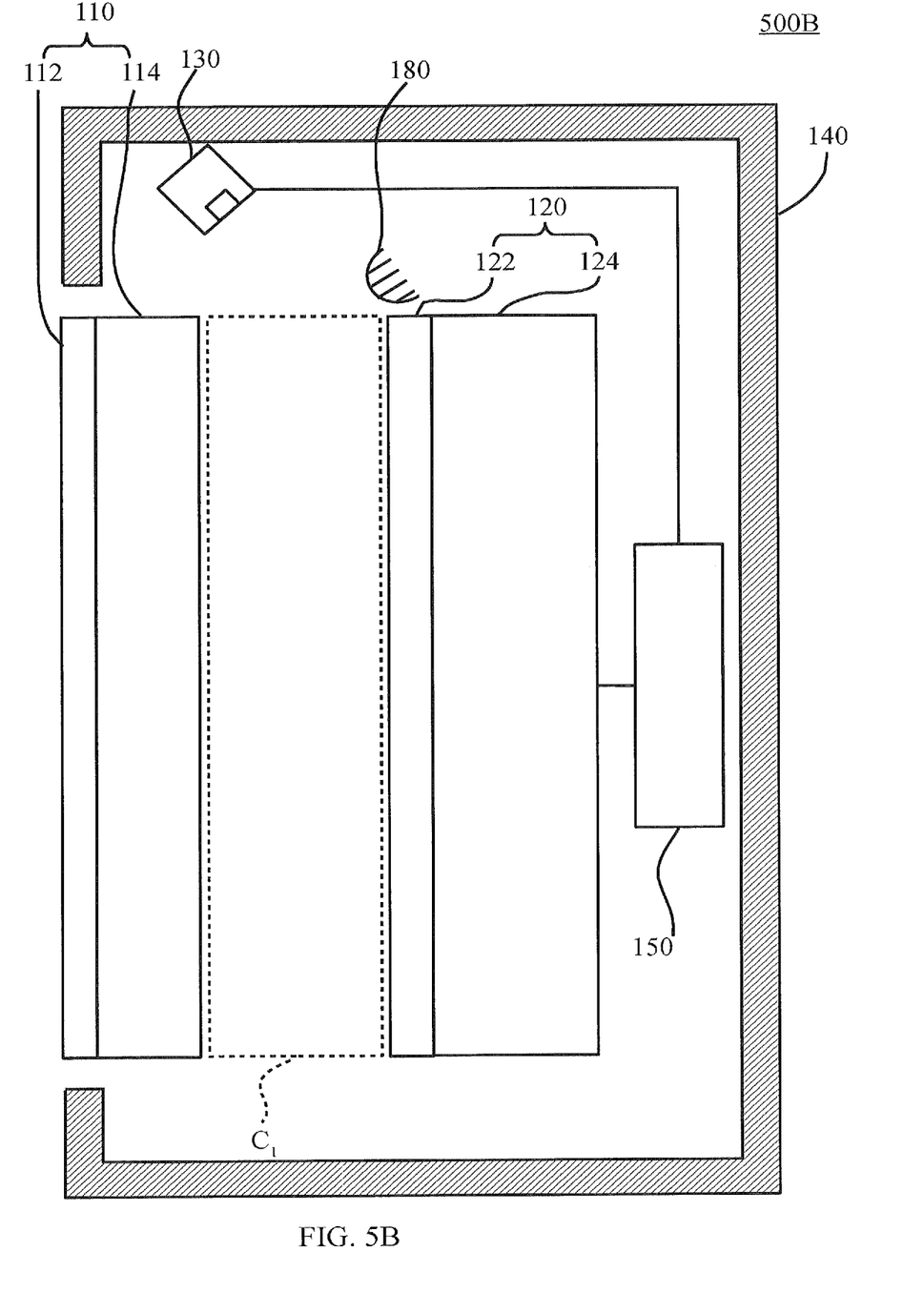
FIG. 5B is a cross-sectional view of a display apparatus 500B according to some embodiments of the present disclosure.

FIG. 5B is a cross-sectional view of a display apparatus 500B according to some embodiments of the present disclosure. As shown in FIG. 5B, the display apparatus 500B includes a display unit 110, a backlight module 120, an image capturing device 130, a housing 140, a control device 150 and a reflector 180. The components of the display apparatus 500B in FIG. 5B with the same reference numerals as those of the display apparatus 200 in FIG. 2 refer to the same or similar components, and thus their detailed descriptions are not repeated here. The difference between the display apparatus 500B shown in FIG. 5B and the display apparatus 200 shown in FIG. 2 is that the display apparatus 500B further includes the reflector 180. The reflector 180 can be, for example, a convex mirror.

As shown in FIG. 5B, the reflector 180 and the image capturing device 130 are disposed in such a way that the image capturing device 130 captures images/videos displayed by the display unit 110 via the reflector 180. The captured images can be transmitted to the control device 150. If the captured images vary with time, the control device 150 determines that the display apparatus is functioning properly. Otherwise, the control device 150 determines that the display apparatus is malfunctioning, and in that case, the control device 150 can adjust the operations of the backlight module 120 and/or other components of the display apparatus 500B. According to some embodiments, an image processing unit and a communication module may be further included in the display apparatus 500B, so as to process the captured image and transmit the same to an external electronic device.

Figure 6A:
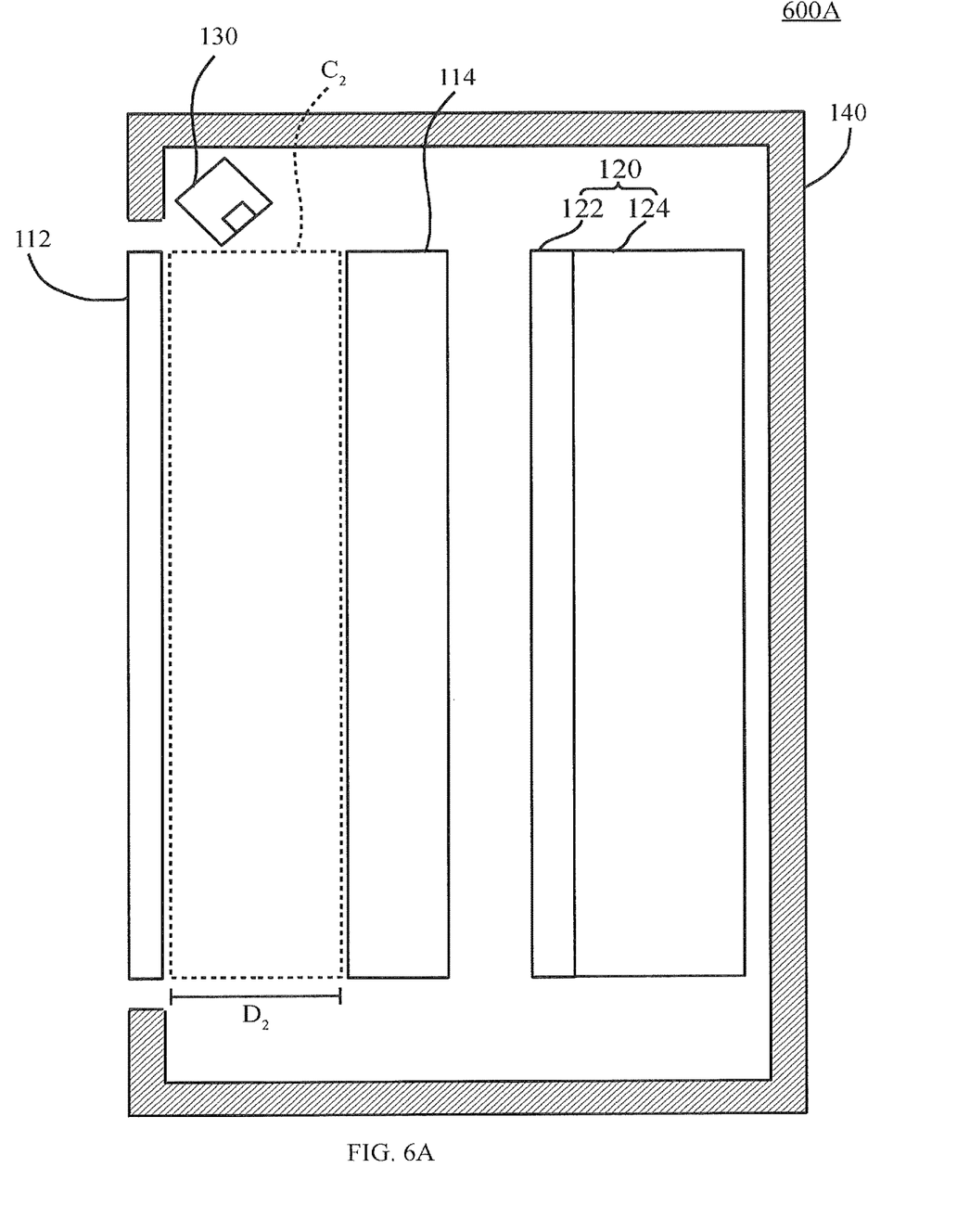
FIG. 6A is a cross-sectional view of a display apparatus 600A according to some embodiments of the present disclosure.

FIG. 6A is a cross-sectional view of a display apparatus 600A according to some embodiments of the present disclosure. As shown in FIG. 6A, the display apparatus 600A includes a transparent plate 112, a liquid crystal layer 114, a backlight module 120, an image capturing device 130 and a housing 140. As shown in FIG. 6A, an optical cavity $C_2$ is formed between the transparent plate 112 and the liquid crystal layer 114. The distance $D_2$ between the transparent plate 112 and the liquid crystal layer 114 may be sufficient for the image capture device to determine that the display device is normal, correct or clear enough. It should be noted that the distance $D_2$ can be properly adjusted based on situational needs so that the image capturing device 130 can be arranged substantially between the transparent plate 112 and the liquid crystal layer 114 and can accurately capture an image of the liquid crystal layer 114 through the optical cavity $C_2$.

The image capturing device 130 can be a camera and is located in the housing 140 without overlapping the display area of the display unit 110. Specifically, the image capturing device 130 is located substantially between the transparent plate 112 and the liquid crystal layer 114 and faces toward the liquid crystal layer 114 for capturing an image of the display unit 110. The images captured over time can be used to determine whether the display unit 110 is functioning properly.

According to the present disclosure, the image capturing device 130 is located substantially between the transparent plate 112 and the liquid crystal layer 114. In some embodiments, the image capturing device 130 can be placed between the transparent plate 112 and the liquid crystal layer 114 and slightly adjacent to the transparent plate 112 or slightly adjacent to the liquid crystal layer 114. In some embodiments, the image capturing device 130 is placed between the transparent plate 112 and the liquid crystal layer 114 and apart from a center of a display area. In some preferred embodiments, the image capturing device 130 is placed between the transparent plate 112 and the liquid crystal layer 114 without overlapping the display area. In another some preferred embodiments, the image capturing device 130 is placed around periphery of a space between the transparent plate 112 and the liquid crystal layer 114. According to the present disclosure, the image capturing device 130 may be fixed on an inner surface of the housing 140, or may be fixed on other components within the housing 140, so as to be placed substantially between the transparent plate 112 and the liquid crystal layer 114.

Figure 6B:
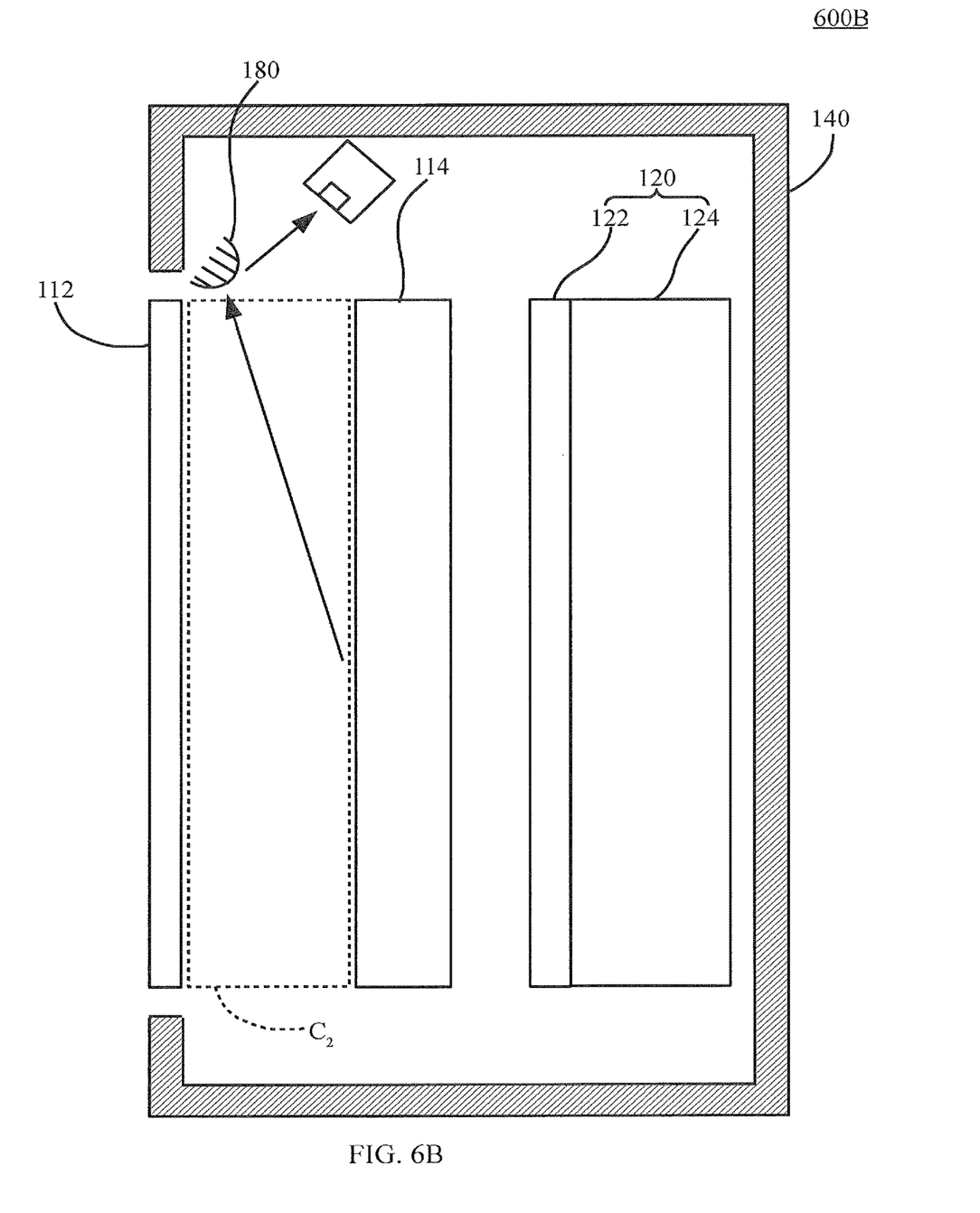
FIG. 6B is a cross-sectional view of a display apparatus 600B according to some embodiments of the present disclosure.

FIG. 6B is a cross-sectional view of a display apparatus 600B according to some embodiments of the present disclosure. As shown in FIG. 6B, the display apparatus 600B includes a transparent plate 112, a liquid crystal layer 114, a backlight module 120, an image capturing device 130, a housing 140 and a reflector 180. The components of the display apparatus 600B in FIG. 6B with the same reference numerals as those of the display apparatus 600A in FIG. 6A refer to the same or similar components, and thus their detailed descriptions are not repeated here. The difference between the display apparatus 600B shown in FIG. 6B and the display apparatus 600A shown in FIG. 6A is that the display apparatus 600B further includes the reflector 180. The reflector 180 can be, for example, a convex mirror. According to some embodiments, a control device, an image processing unit and a communication module may be further included in the display apparatus 600A or 600B, so as to process the captured image and transmit the same to an external electronic device.

As described in the embodiments of FIGS. 5A and 5B, the reflector 180 and the image capturing device 130 are disposed in such a way that the image capturing device 130 captures images displayed by the liquid crystal layer 114 via the reflector 180. As indicated by the arrow in FIG. 6B, the images/videos displayed by the liquid crystal layer 114 can be projected on the reflector 180, and thus the image capturing device 130 can capture an image shown on the reflector 180. The captured images can be further processed or used to determine whether the display unit 110 is functioning properly.

Figure 7:
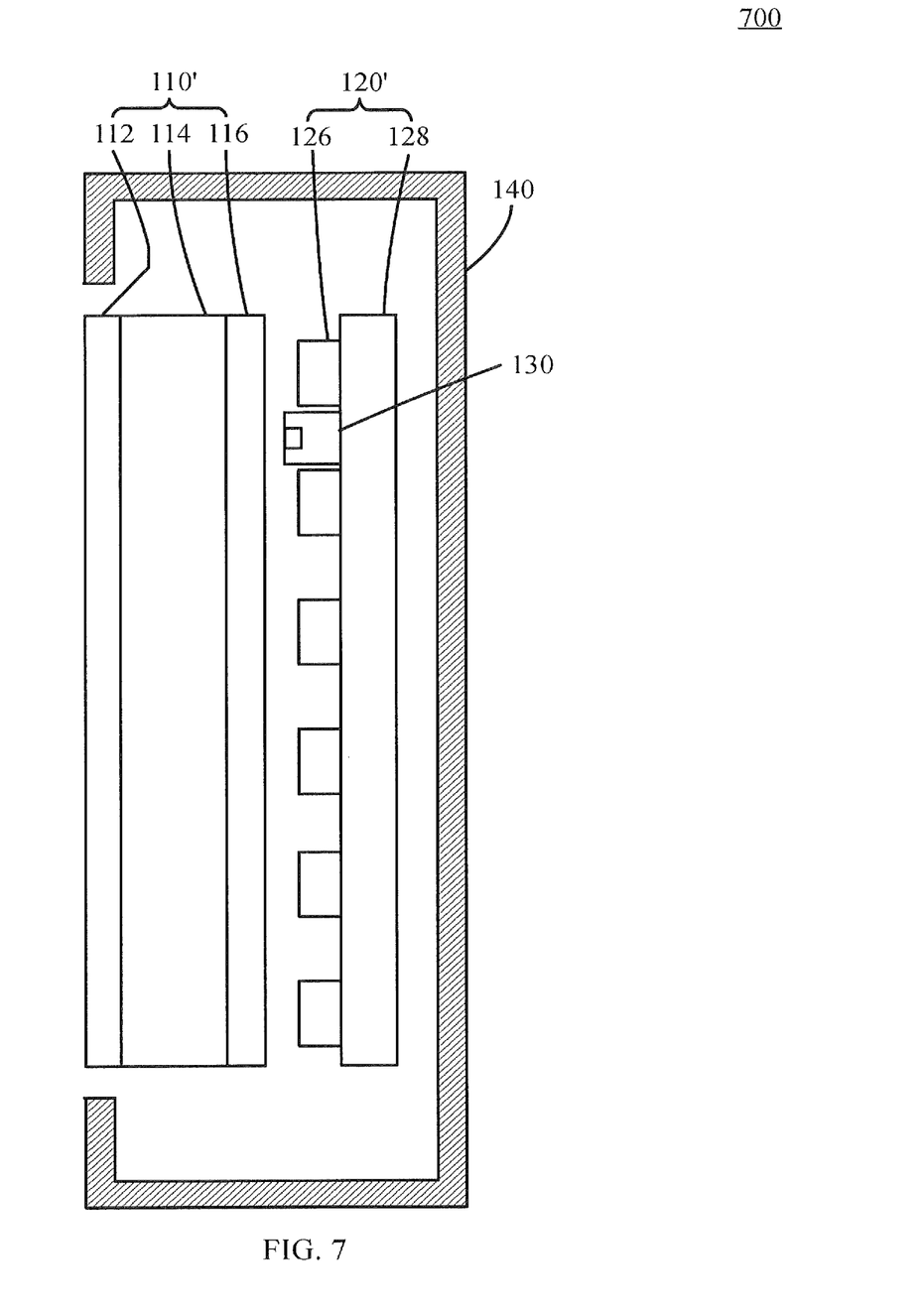
FIG. 7 is a cross-sectional view of a display apparatus 700 according to some embodiments of the present disclosure.

FIG. 7 is a cross-sectional view of a display apparatus 700 according to some embodiments of the present disclosure. In this embodiment, the display apparatus 700 can be, for example, a liquid crystal display with a direct LED backlight module. As shown in FIG. 7, the display apparatus 700 includes a display unit 110', a backlight module 120', an image capturing device 130 and a housing 140.

The display unit 110' includes a transparent plate 112, a liquid crystal layer 114 and one or more optical films 116. The one or more optical films 116 can be, for example, a light diffuser, a light reflector, a brightness enhancement film, or a combination of two or more thereof. The type and number of optical films to be used can be determined based on situational needs and are not limited here.

The backlight module 120' includes a plurality of light sources 126 and a backlight assembly 128 for mounting the light sources 126. The light sources 126 can be, for example, a plurality of LEDs, which may be placed on the front surface of the backlight assembly 128 to provide backlight illumination for the display unit 110'. As shown in FIG. 7, since the optical films 116 may diffuse the light from the light sources 126, a light guide or a cavity between the display unit 110' and the backlight module 120' can be skipped. Thus, the thickness of the display apparatus 700 can be reduced. However, in some other embodiments, a light guide or a cavity can be arranged between the display unit 110' and the backlight module 120', so as to have more uniform illumination on the display area.

The image capturing device 130 is mounted on the backlight module 120' among the plurality of light sources 126 for capturing an image of the display unit 110. The images captured over time can be further processed and used to determine whether the display unit 110' is functioning properly. In one embodiment, the image capturing device 130 is located within or outside of the display area of the display unit 110'. Since the optical films, the light guide or the cavity may diffuse the light generated by the light sources 126, the user outside of the display apparatus would not notice the image capturing device 130 among the light sources 126. It should be noted that the number and type of image capturing devices to be mounted on the backlight module 120' can be determined based on situational needs and thus are not limited here. According to some embodiments, a control device, an image processing unit and a communication module may be further included in the display apparatus 700, so as to process the captured image and transmit the same to an external electronic device.

Based on the above, the present disclosure provides a display apparatus with a more precise self-detection capability so as to ensure that the display apparatus is functioning properly. Since the image capturing device is completely hidden inside the display apparatus and captures images toward the liquid crystal layer or the reflector, a viewer or passers-by cannot perceive the presence of the image sensing device of the display apparatus, and thus personal privacy issues can be avoided.

As used herein, the singular terms "a," "an" and "the" may include plural referents unless the context clearly indicates otherwise. For example, reference to an electronic device may include multiple electronic devices unless the context clearly indicates otherwise.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation.

As used herein, the terms "connect," "connected" and "connection" refer to an operational coupling or linking. Connected components can be directly or indirectly coupled to one another through, for example, another set of components.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless otherwise specifically indicated herein, the order and grouping of the operations are not limitations of the present disclosure.

What is claimed is:

1. A display apparatus comprising:
a housing;
a display unit;
a transparent plate for protecting the display unit;
a backlight module; and
a first image capturing device, located in the housing and substantially between the display unit and the transparent plate, wherein the first image capturing device is disposed without overlapping the display area of the display unit and is configured to capture a first image of the display unit.

2. The display apparatus of claim 1, wherein the first image capturing device faces toward the display unit.

3. The display apparatus of claim 1, further comprising a reflector, wherein the reflector and the first image capturing device are located in such a way that the first image capturing device captures the first image via the reflector.

4. The display apparatus of claim 3, wherein the reflector is a convex mirror.

5. The display apparatus of claim 1, wherein the first image capturing device is located apart from a center of a display area of the display unit.

6. The display apparatus of claim 1, further comprising a control device, wherein the control device turns down the brightness of the backlight module when the first image capturing device captures the first image.

7. The display apparatus of claim 1, wherein the first image corresponds to substantially a display area of the display unit.

8. The display apparatus of claim 1, further comprising a second image capturing device for capturing a second image of the display unit, wherein the first image corresponds to a first portion of a display area of the display unit and the second image corresponds to a second portion of the display area of the display unit different from the first portion.

9. The display apparatus of claim 8, further comprising an image processing unit, wherein the image processing unit, based on the first image and the second image, generates a third image corresponding to a third portion of the display area, wherein the third portion overlaps the first portion and the second portion and is bigger than both the first portion and the second portion.

10. The display apparatus of claim 1, further comprising a communication module for transmitting the first image to an electronic device separated from the display apparatus.

11. The display apparatus of claim 1, wherein the backlight module comprises an optical film.

* * * * *